US010549645B2

(12) United States Patent
Zhao et al.

(10) Patent No.: US 10,549,645 B2
(45) Date of Patent: Feb. 4, 2020

(54) SMART-CHARGING APPARATUS FOR USE WITH ELECTRIC-VEHICLE-SHARING STATIONS

(71) Applicant: GM Global Technology Operations LLC, Detroit, MI (US)

(72) Inventors: Xiang Zhao, Novi, MI (US); JiangLing Du, Beaverton, OR (US); Susan M. Smyth, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/108,783

(22) Filed: Aug. 22, 2018

(65) Prior Publication Data

US 2018/0361870 A1 Dec. 20, 2018

Related U.S. Application Data

(63) Continuation-in-part of application No. 15/425,766, filed on Feb. 6, 2017, now Pat. No. 10,293,699.

(51) Int. Cl.
*H02J 7/00* (2006.01)
*B60L 11/18* (2006.01)
(52) U.S. Cl.
CPC ......... *B60L 11/1846* (2013.01); *H02J 7/0029* (2013.01); *H02J 2007/0037* (2013.01)
(58) Field of Classification Search
CPC ................... H02J 7/0029; H02J 2007/0037

USPC .......................................................... 320/109
See application file for complete search history.

(56) References Cited

U.S. PATENT DOCUMENTS

| 6,947,881 | B1* | 9/2005 | Murakami | ............ | B60L 53/305 703/8 |
| 7,181,409 | B1* | 2/2007 | Murakami | ............ | B60L 53/305 705/5 |
| 10,166,978 | B2* | 1/2019 | Lorenz | ................. | G05D 1/0282 |
| 10,176,717 | B2* | 1/2019 | Mazzola | ............... | G01C 21/362 |
| 2003/0209375 | A1* | 11/2003 | Suzuki | ..................... | B60K 1/04 180/65.22 |
| 2013/0057210 | A1* | 3/2013 | Nergaard | ............... | B60L 53/305 320/109 |
| 2013/0222158 | A1* | 8/2013 | Dai | ........................ | G06Q 50/30 340/995.13 |

(Continued)

*Primary Examiner* — Suchin Parihar
(74) *Attorney, Agent, or Firm* — Reising Ethington P.C.

(57) ABSTRACT

Systems for use in connection with custom powering of a vehicle that includes a charging station track and a charging base positioned at or along the charging station track at an available parking position. The system a controller having a processing hardware unit and a non-transitory storage device comprising computer-executable code that when executed causes the processing hardware unit performs operations including (i) receiving a power level indicating a current power level of the vehicle and/or a time stamp indicating an arrival time of the vehicle to a location proximate to the charging station track, (ii) sending a first signal to the vehicle causing the vehicle to move to the available position along the charging station track, (iii) charging the vehicle to a predetermined power level using the charging base, and (iv) sending a second signal to the vehicle causing the vehicle to move out of the available position at the charging station.

17 Claims, 5 Drawing Sheets

(56) References Cited

U.S. PATENT DOCUMENTS

| | | | |
|---|---|---|---|
| 2014/0257884 A1* | 9/2014 | Kyoung | G06Q 10/02 |
| | | | 705/5 |
| 2014/0336965 A1* | 11/2014 | Mori | B60L 58/12 |
| | | | 702/63 |
| 2014/0354229 A1 | 12/2014 | Zhao et al. | |
| 2015/0039213 A1* | 2/2015 | Stefan | G08G 1/00 |
| | | | 701/117 |
| 2015/0073642 A1* | 3/2015 | Widmer | G01C 21/36 |
| | | | 701/22 |
| 2017/0313305 A1* | 11/2017 | Irion | B60W 30/06 |
| 2017/0329346 A1* | 11/2017 | Latotzki | B62D 15/0285 |
| 2018/0012156 A1* | 1/2018 | Voelz | B60L 58/10 |
| 2018/0105051 A1* | 4/2018 | Zheng | B60L 11/1824 |
| 2019/0016331 A1* | 1/2019 | Carlson | B60W 30/06 |
| 2019/0031038 A1* | 1/2019 | Pursifull | B60L 53/65 |
| 2019/0202315 A1* | 7/2019 | Wilding | B60L 53/63 |
| 2019/0205842 A1* | 7/2019 | Starns | G05D 1/0088 |
| 2019/0263271 A1* | 8/2019 | Ashby | G06Q 10/06316 |
| 2019/0275892 A1* | 9/2019 | Williams | B60L 53/35 |

\* cited by examiner

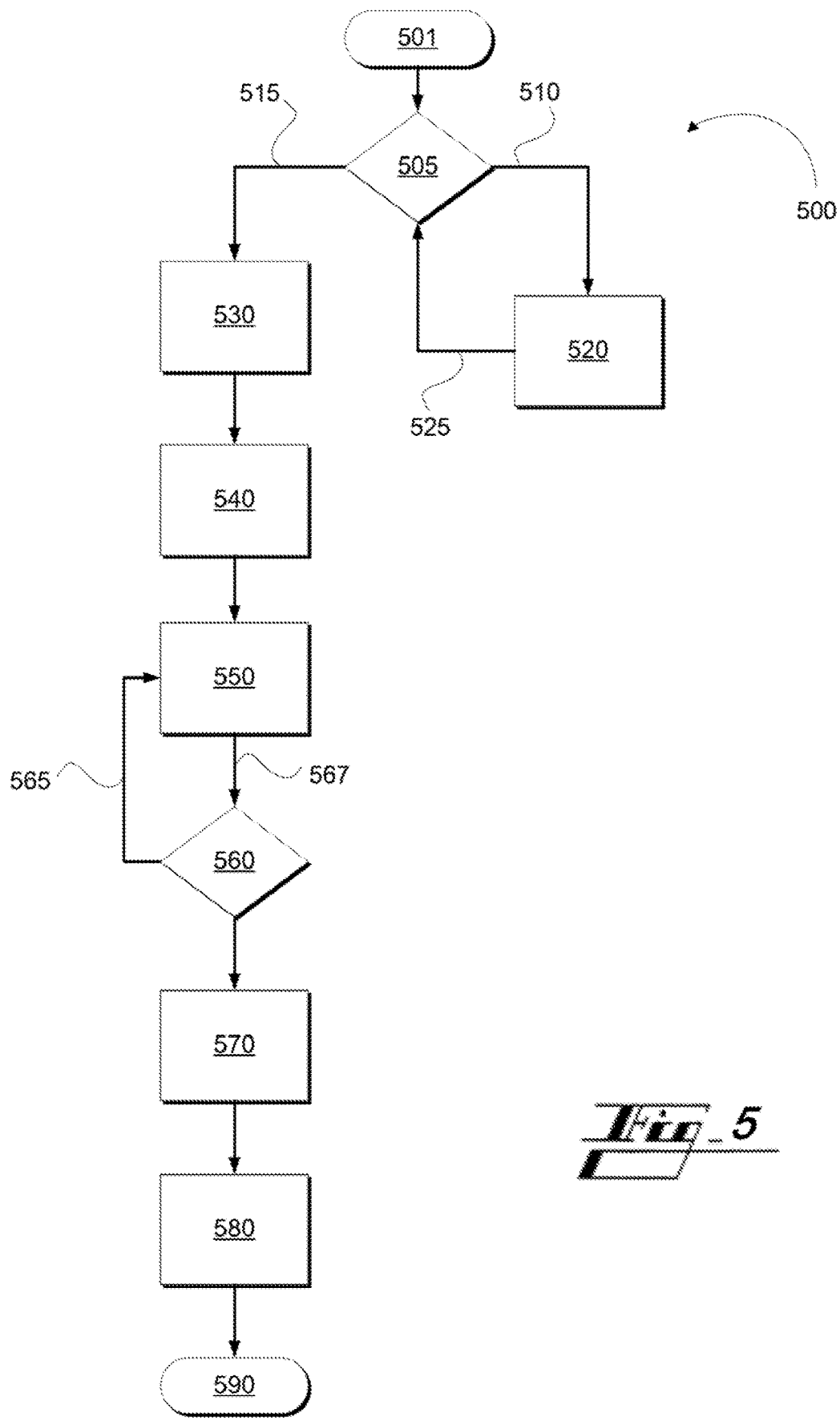

SMART-CHARGING APPARATUS FOR USE WITH ELECTRIC-VEHICLE-SHARING STATIONS

CROSS REFERENCE

The present application is a continuation-in-part of U.S. patent application Ser. No. 15/425,766, filed on Feb. 6, 2017.

TECHNICAL FIELD

The present disclosure relates generally to apparatus facilitating sharing electric vehicles and, more particularly, to smart-charging apparatus with systems for reserving and intelligently charging shared electric vehicles.

BACKGROUND

This section provides background information related to the present disclosure which is not necessarily prior art.

Vehicle-sharing arrangements allow multiple users obtain rights to use a vehicle part-time, and are gaining popular.

By mobile phone applications, users reserve a vehicle for a shared use, similar to conventional applications for arranging vehicle rentals.

Some shared-vehicle lots include electric vehicles (EVs). EVs, including extended-range electric vehicles (EREVs) and hybrid electric vehicles (HEVs), have an energy storage system, or battery, requiring periodic charging. The energy storage systems are charged by a lot power source such as an alternating-current (AC) or a direct current (DC) supply line when the EVs are parked at the shared-vehicle lot.

SUMMARY

There is a need for smart-powering apparatus, such as smart-charging apparatus, for efficiently charging and/or fueling vehicles such as EVs for shared uses. Efficient charging includes not overcharging a vehicle.

Efficient charging may include, for instance, not charging an EV having a power level allowing three hours of driving when the next user will be using the vehicle for only one hour. Or, charging an EV having two and a half hours of power to only a three and one quarter-hour level when the next user only needs the vehicle for three hours.

Managing charging in the disclosed ways has various benefits. One benefit is conservation of power, by using less source energy to charge/fuel the vehicles in the lot. Also, using less energy may benefit the environment, such as by decreasing a carbon footprint, or other ecological measure, of the vehicle lot.

In various embodiments, the technology includes systems for use in connection with custom powering of a vehicle. The system, in various embodiments includes a charging station track and a charging base positioned at or along the charging station track. In some embodiments, the charging base is positioned at an available parking position. In some embodiments, the charging base is movable (e.g., by a controller) along the charging track to any parking position proximal to the charging station track. In some embodiments, there is more than one charging station positioned along the charging station track, and each charging base is movable (e.g., by a controller) along the track to and able to be positioned at various parking positions proximate to the track.

The technology further includes a controller having a processing hardware unit and a non-transitory storage device comprising computer-executable code. When the computer-executable code is executed, the processing hardware unit performs operations including (i) receiving a power level indicating a current power level of the vehicle and/or a time stamp indicating an arrival time of the vehicle to a location proximate to the charging station track, (ii) sending a first (e.g., drive in) signal to the vehicle causing the vehicle to move to the available position along the charging station track, (iii) charging the vehicle to a predetermined power level using the charging base, and (iv) sending a second (e.g., drive out) signal to the vehicle causing the vehicle to move out of the available position at the charging station.

In some embodiments, the receiving operation also includes receiving a desired pick up time from the user that determines when the first signal is sent to the vehicle.

In some embodiments, the vehicle is one of a plurality of vehicles. In some particular embodiments, the first signal is sent to the vehicle based on the time stamp of the vehicle preceding time stamps of other vehicles of the plurality. In other particular embodiments, the first signal is sent to the vehicle based on the current power level of the vehicle being lower than current power levels of other vehicles of the plurality.

In some embodiments, the second signal causes the vehicle to move to a waiting area comprising one or more parking spaces available for storage of a vehicle. In some embodiments, the second signal is sent to the vehicle when the vehicle reaches a maximum charge. In other embodiments, the second signal is sent to the vehicle when the vehicle reaches a charge predetermined by the owner or other source (e.g., controller algorithm).

In some embodiments, the predetermined power level is based one or more factors such as a desired pick up time, an amount of power needed for the vehicle to reach a subsequent destination, an environmental characteristic in the area corresponding to the desired use, a traffic condition in an area corresponding to the desired use, a road condition in the area corresponding to the desired use, and an expected type of driving for the vehicle use.

In various embodiments, the technology includes methods for use in connection with custom powering of a vehicle. The method, in various embodiments includes (i) receiving, by a controller comprising a processing hardware unit and a non-transitory storage device, a power level indicating a current power level of the vehicle and a time stamp indicating an arrival time of the vehicle to a location proximate to the charging station track, (ii) sending, by the controller, a first signal to the vehicle causing the vehicle to move to an available parking position along a charging station track, (iii) charging, using a charging base positioned along the charging track at or near the available parking position, the vehicle to a predetermined power level, and (iv) sending, to the vehicle, a second signal causing the vehicle to move out of the available position at the charging station.

Various aspects of the present technology include non-transitory computer-readable storage devices, processing units, and algorithms configured to perform any of the operations described.

Other aspects of the present technology will be in part apparent and in part pointed out hereinafter.

DESCRIPTION OF THE DRAWINGS

FIG. 5 shows an example autonomous charging process for the arrangement of FIG. 4.

The figures are not necessarily to scale and some features may be exaggerated or minimized, such as to show details of particular components.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Technology Introduction

The present disclosure describes, by various embodiments, smart-charging apparatus with systems for reserving shared electric vehicles.

While select examples of the present technology describe transportation vehicles or modes of travel, and particularly automobiles, the technology is not limited by the focus. The concepts can be extended to a wide variety of systems and devices, such as other transportation or moving vehicles including aircraft, watercraft, trucks, busses, trolleys, trains, commercial or manufacturing equipment (a forklift, for example), construction machines, and agricultural machinery, the like, and other.

While select examples of the present technology relate to EVs, generally, including EREVs, the technology can be used with partially electric vehicles, such as HEVs.

In contemplated embodiments, the technology is used with vehicles that are not EVs, such as fully gasoline-fueled vehicles. Electrical-charging components can be supplemented with other-fuel components, such as for HEVs, or replaced with such other-fuel components, such as components for providing gasoline.

While select examples of the present technology describe an applicable power as electricity, and smart-charging electric vehicles, the technology may be applied to other power bases, such as gasoline. The descriptions provided regarding electric charging may be applied analogously to use with any type of vehicle including hybrid and fully gasoline-fueled vehicles.

II. Smart-Charging Arrangement—FIG. 1

Figure 1:
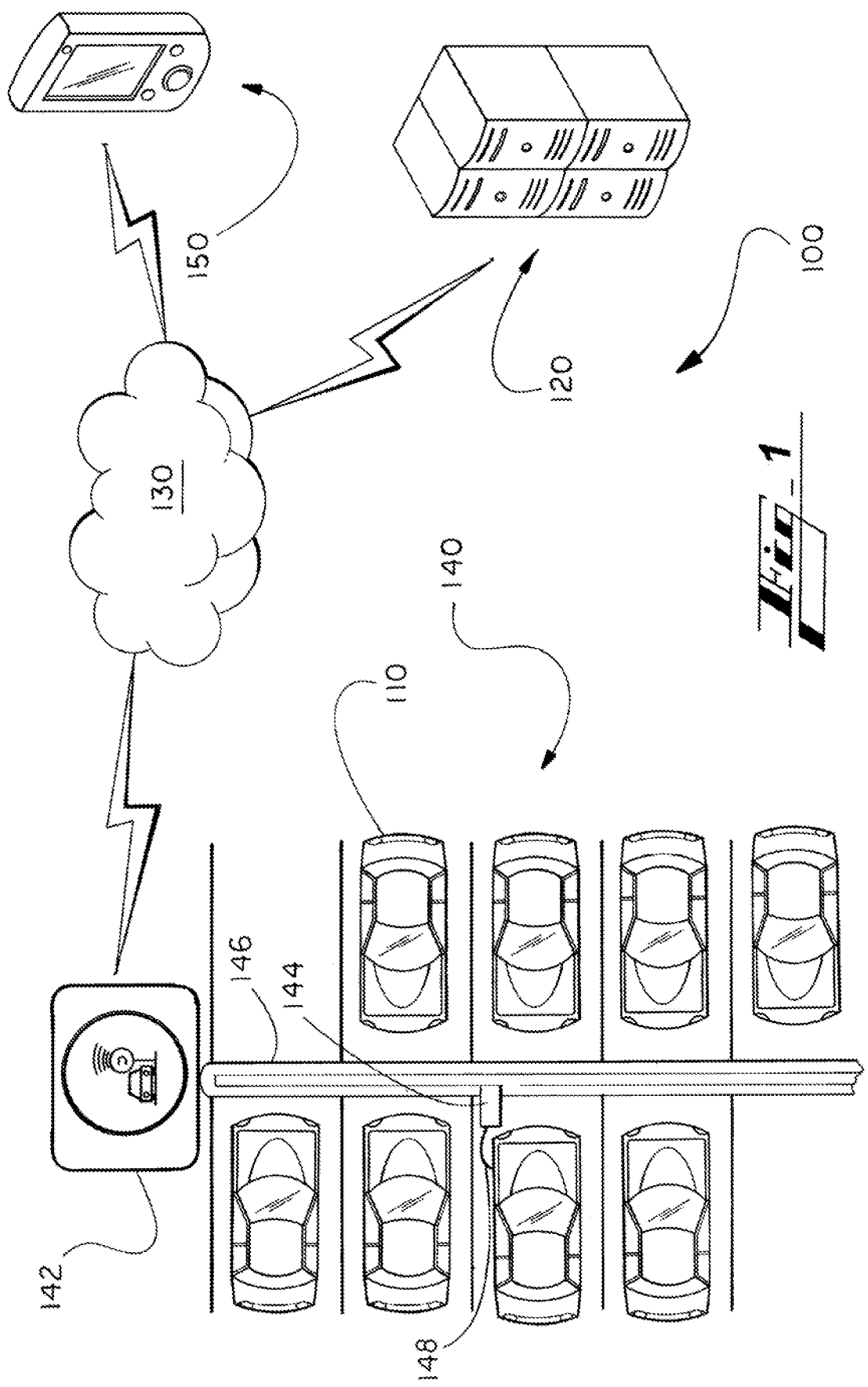
FIG. 1 illustrates schematically an arrangement for smart-charging shared electric vehicles, including a remote server in communication by way of a communication system with a smart-charging station and a user device.

Turning now to the figures and more particularly the first figure, FIG. 1 shows an arrangement 100 for smart-charging shared electric vehicles 110, including a remote system 120 in communication by way of a communication system 130 with a smart-charging station 140 and a user device 150.

The smart-charging station 140 includes a charging controller 142, and other charging components 250 (FIG. 2), such as charging-facilitating hardware. The other charging components 250 may include, for instance, a charging base 144, which can include a charging robot, movable in some embodiments along a charge-station track 146 and a charging connector 148, including an end effector, or port, for connecting to the vehicles 110.

Example features for the smart-charging station 140 are described in U.S. Published Patent Application No. 2014-0354229. Any of the features described therein may be used with the present technology and are incorporated herein as exemplary, not required, configurations and methods. The features are thus not all described expressly herein. For instance, the charge-station track 146 of the present technology can come in any of a variety of arrangements, such as a ground or vehicle-level track, and an overhead or high-level track, as described in the '229 publication.

The charging controller 142, of the smart-charging station 140 of the present technology, includes novel and non-obvious features.

The charging controller 142 receives a signal, message, or other communication from any or each EV 110 indicating a power level of the EV 110. The signal is in some implementations sent by the EV 110 in response to a charge-level inquiry or request communication being received at the EV 110 from the charging controller 142.

The charging controller 142 and the vehicles 110 are in various embodiments configured for wireless communications between them. Wireless structures and protocols, such as the Bluetooth standard, that can be used are described more below.

While wireless communications would typically be more efficient and flexible for communications between the charging controller 142 and vehicles 110, in a contemplated embodiment, the charging controller 142 and the EV 110 are configured to communicate with each other by a wired connection, such as by way of a communication line that is connected to or part of the charging connector 148. Shortcomings of wired communications include the need to plug-in.

The charging controller 142 includes or is connected to a power source, such as an AC power source, for use in charging the EVs 110.

In various embodiments, the charging station 140 includes more than one charging base 144 moving along one or more tracks 146.

For embodiments in which the charging base 144 is computer controllable, such as to move along the track(s) 146, the charging controller 142 is configured to control the charging base 144 accordingly. The charging controller 142 comprises, for instance, computer-executable code stored at a controller storage device that, when executed by a processing unit of the charging controller 142, controls at least position of the charging base 144 on the track 146.

For embodiments in which the charging base 144 includes robotics, or automated components or machinery, the charging controller comprises computer-executable code that, when executed by a processing unit of the charging controller 142, controls the charging base 144 accordingly. The controller 142 thus in various embodiments controls positioning of the charging base 144 along the track(s) 146 to a selective EV(s), and in various embodiments controls automated componentry of the base 144 to connect the base 144 to the EV 110 using the charging connector 148, which may also be controlled by the automated componentry.

While automated operation is preferred in most embodiments, in contemplated implementations, any of the connecting steps, such as moving the charging base 144 and connecting the charging connector 148 (e.g., end effector, or port) to the EV 110 may be performed manually.

Potential user devices 150 include a user tablet, laptop, desktop computer, a user smartphone, as illustrated by way of example, or a user wearable device, such as smart eye glasses or a smart watch. The remote device(s) 120 are in various embodiments nearby the EV 110, remote to the vehicle, or both.

The remote device(s) 120 can be configured with any suitable structure for performing the operations described herein. Example structure includes any or all structures like those described in connection with a computing device of the EV 110.

The remote system 120 includes, for instance, a processing unit, a storage medium comprising units or modules, a communication bus, and an input/output communication structure. These features are considered shown for the remote system 120 by FIG. 1 and the cross-reference provided by this paragraph.

Example remote systems 120 include a remote server—for example, an application server—or a remote data, customer-service, and/or control center. A user computing or electronic device 150, such as a smartphone, is typically also remote to the EV 110, and in communication with the remote system 120 by way of the Internet or other communication network 130.

Regarding the remote system 120 An example control center is the OnStar® control center, having facilities for interacting with vehicles and users, whether by way of the vehicle or otherwise (for example, mobile phone) by way of long-range communications, such as satellite or cellular communications. ONSTAR is a registered trademark of the OnStar Corporation, which is a subsidiary of the General Motors Company.

Figure 2:
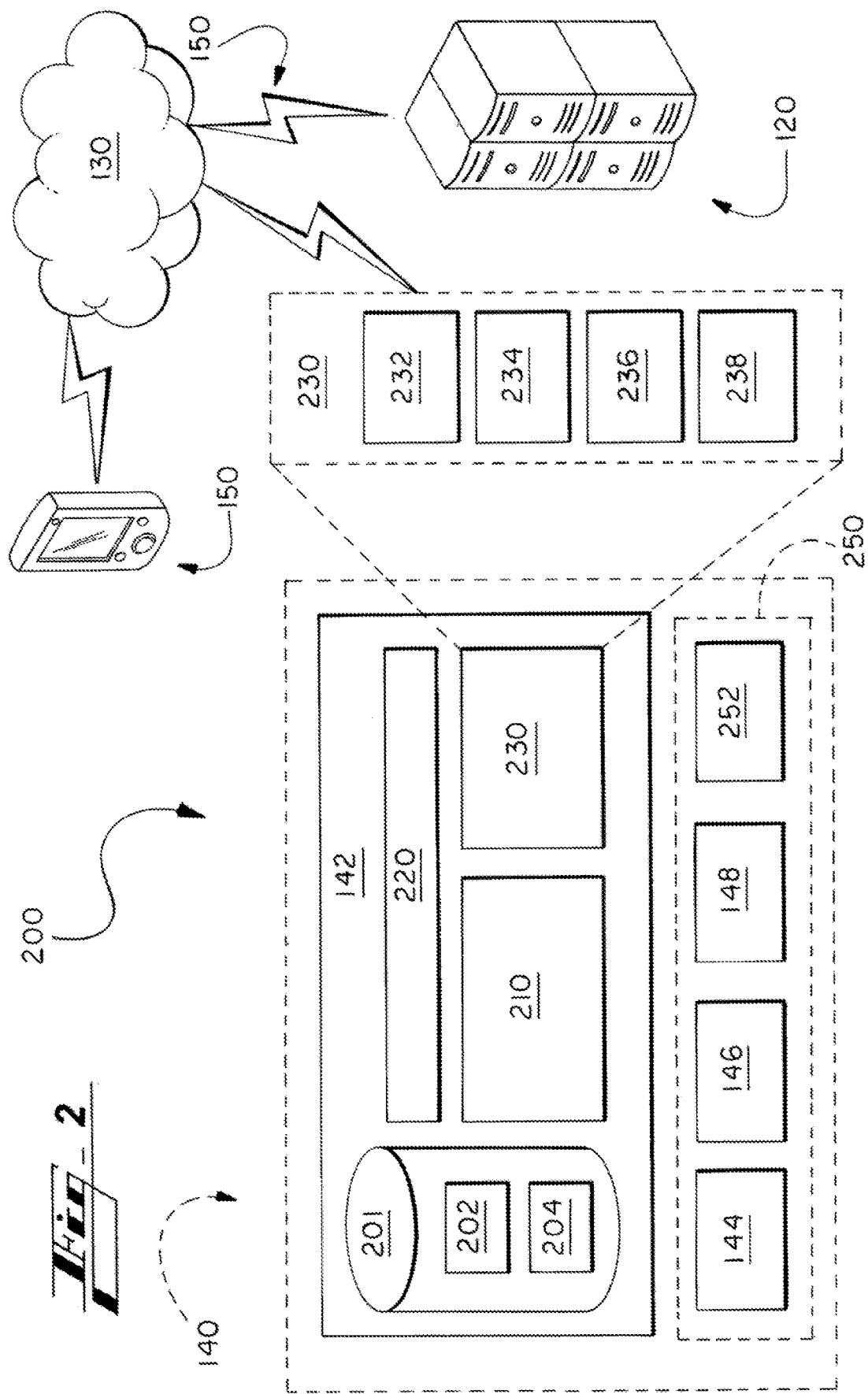
FIG. 2 illustrates schematically components of the smart-charging station of FIG. 1, according to embodiments of the present technology.

While the structure of FIG. 2 is described primarily in connection with the example context of a charging station 140, other apparatus described herein, such as user devices 150, e.g., smartphone, or a remote server or computer system 120 may include any analogous structure. Each computing device referenced herein, such as a remote system 120, the charging controller 142—a user device 150, for instance, including a computer-readable storage device, for instance, with a processor, an input/output component such as a transceiver, etc.

The arrangement 100 may be used in any of a wide variety of contexts, such as a vehicle-loan or car-rental arrangement, a vehicle-fleet arrangement, or a dealership/vehicle-maintenance arrangement that loans or rents vehicles to customers having their other car serviced, and need to use an EV 110 temporarily, or who are considering purchasing an EV 110.

III. Example Smart-Charging Station Architecture—FIG. 2

FIG. 2 illustrates schematically hardware and software components, according to embodiments of the present technology. The architecture 200 may be that of the smart-charging station 140 of FIG. 1, including the controller system 142, for instance.

The structure shown can also represent any of the computing devices described herein, such as the remote system 120, the user device 150, each EV 110, as described further below.

The controller system 142 can be referred to by other terms, such as computing apparatus, controller, controller apparatus, or such descriptive term, and can be or include one or more microcontrollers, as referenced above.

The controller system 142 is, in various embodiments, part of the mentioned greater system 140, such as the smart-charging station.

The controller system 142 includes a hardware-based computer-readable storage device 201 and a hardware-based processing unit 210. The processing unit 210 is connected or connectable to the computer-readable storage device 201 by way of a communication link 220, such as a computer bus or wireless components.

The processing unit 210 can be referenced by other names, such as processor, processing hardware unit, the like, or other.

The processing unit 210 can include or be multiple processors, which could include distributed processors or parallel processors in a single machine or multiple machines. The processing unit 210 can be used in supporting a virtual processing environment.

The processing unit 210 can include a state machine, application specific integrated circuit (ASIC), or a programmable gate array (PGA) including a Field PGA (FPGA), for instance. References herein to the processing unit executing code or instructions to perform operations, acts, tasks, functions, steps, or the like, could include the processing unit performing the operations directly and/or facilitating, directing, or cooperating with another device or component to perform the operations.

In various embodiments, the data storage device 201 is any of a volatile medium, a non-volatile medium, a removable medium, and a non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 201 includes one or more storage units or modules 202 storing computer-readable code or instructions executable by the processing unit 210 to perform the functions of the controller system 142 described herein. The units or modules and functions are described further below in connection with FIG. 3.

The data storage device 201 in some embodiments also includes ancillary or supporting components 204, such as additional software and/or data supporting performance of the processes of the present disclosure, such as one or more user profiles or a group of default and/or user-set preferences.

As provided, the controller system 142 also includes a communication sub-system 230 for communicating with local and external devices and networks 120, 130, 150. The communication sub-system 230 in various embodiments includes any of a wire-based input/output (i/o) 232, at least one long-range wireless transceiver 234, and one or more short- and/or medium-range wireless transceivers 236.

The component 238 is shown by way of example to emphasize that the system can be configured to accommodate one or more other types of wired or wireless communications.

The long-range transceiver 234 is in some embodiments configured to facilitate communications between the controller system 142 and a satellite and/or a cellular telecommunications network, which can be considered also indicated schematically by reference numeral 40.

The short- or medium-range transceiver 236 is configured to facilitate short- or medium-range communications, such as communications with other vehicles, in vehicle-to-vehicle (V2V) communications, and communications with transportation system infrastructure (V2I). Broadly, vehicle-to-entity (V2X) can refer to short-range communications with any type of external entity (for example, devices associated with pedestrians or cyclists, etc.).

To communicate V2V, V2I, or with other extra-vehicle devices, such as local communication routers, etc., the short- or medium-range communication transceiver 236 may be configured to communicate by way of one or more short- or medium-range communication protocols. Example protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

By short-, medium-, and/or long-range wireless communications, the controller system 142 can, by operation of the processor 210, send and receive information, such as in the form of messages or packetized data, to and from the vehicles 110 at the charging station 140 communication network(s) 130 or non-vehicle devices 150.

The apparatus 140 may also include various suitable output components controlled by the controller system 142 for performing the operations described herein. Example output components 140 include components of the base or robot 146, of the track 144, of the end effector 148, and a charging switch 252 used to control power delivered selectively to an EV 110 that the base 144 is connected to.

IV. Flow Diagram—FIG. 3

Figure 3:
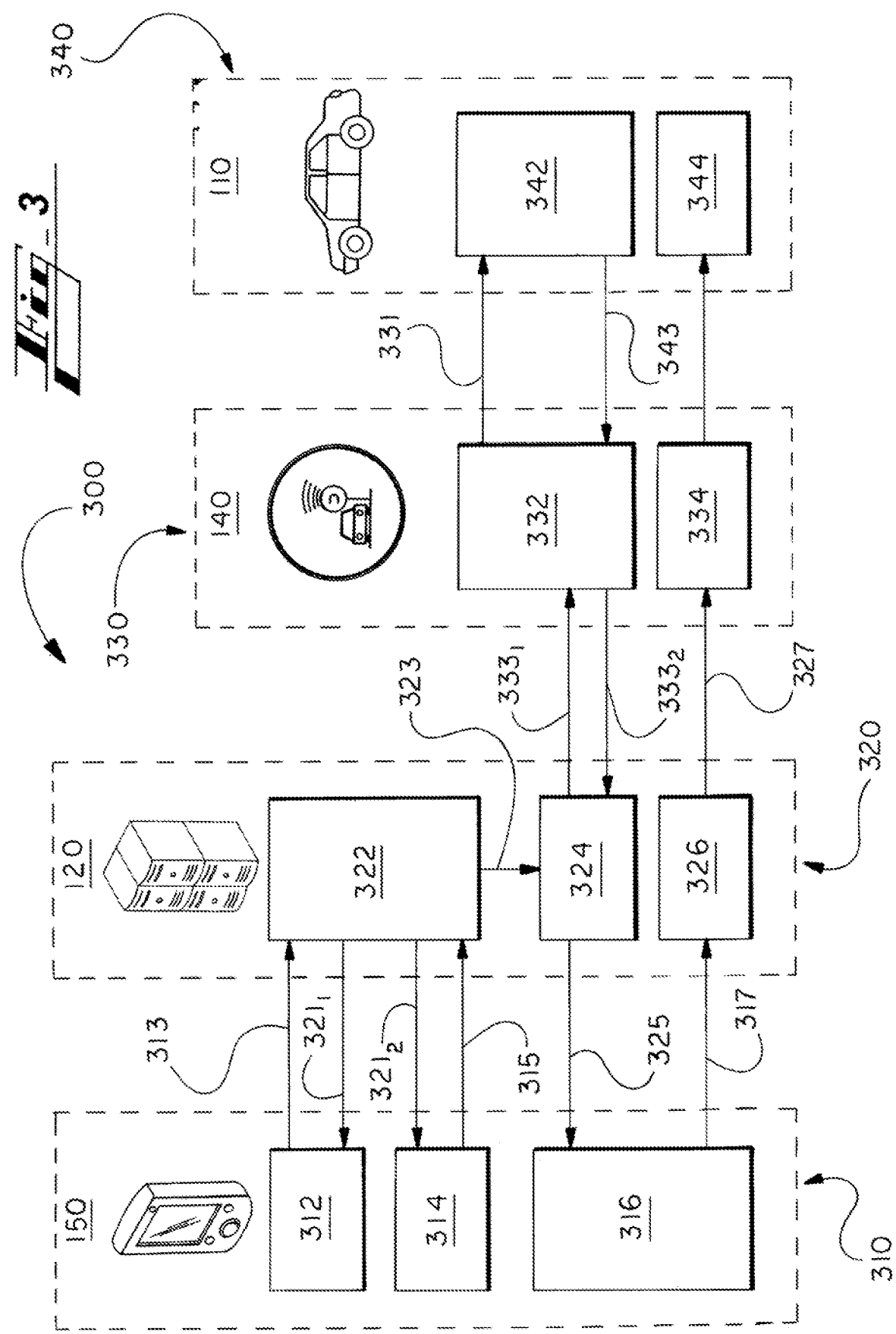
FIG. 3 shows an example omnibus process including sub-processes for performing functions of the present technology.

FIG. 3 shows an example omnibus process 300 including sub-processes 310, 320, 330, 340 for performing functions of the present technology. The processes incorporate various suitable algorithms for performing the subject functions.

Though a single, omnibus flow 300 is shown for simplicity, as are individual sub-processes 310, 320, 330, 340, any of the functions or operations thereof can be in one or more processes, sub-processes, routines, or sub-routines, using one or more algorithms, performed by one or more devices or systems.

It should be understood that steps, operations, or functions of the processes are not necessarily presented in any particular order and that performance of some or all the operations in an alternative order is possible and is contemplated. The processes can also be combined or overlap, such as one or more operations of one of the processes being performed in the other process.

The operations have been presented in the demonstrated order for ease of description and illustration. Operations can be added, omitted and/or performed simultaneously without departing from the scope of the appended claims. It should also be understood that the illustrated processes can be ended at any time.

In various embodiments, some or all operations of the processes and/or substantially equivalent operations are performed by one or more computer processors, such as the processor of the corresponding apparatus—e.g., the hardware-based processing unit 210 regarding operations of the charging-station controller 142—executing computer-executable instructions, which may be arranged in modules as described and stored on a non-transitory computer-readable storage device of the corresponding apparatus—e.g., the data storage device 201 regarding the operations of the charging-station controller 142.

The sub-processes 310, 320, 330, 340 correspond as shown to algorithms and operations of the user device 150, the remote system 120, the smart-charging station 140, and the electric vehicle (EV) 110, respectively.

In various contemplated embodiments, any of the functions shown at one of the devices 110, 120, 140, 150 may performed by another device. For instance, determining vehicle options, based on reservation request data, may be performed at the application of the user device 110 or at the smart-charging station 140, instead of at the remote server 120, at block 324.

At block 312, the user device 150—e.g., a tangible processor thereof, executing computer-executable code thereof—receives input indicating a desired pick-up time and a desired drop-off time. In various embodiments, desired pick-up and drop off time(s) indicated by the user are represented by a range of potential times. The input is received from a user of the device, for instance.

At block 314, the user device 150 receives at least one desired pick-up location (314), at which the user would like to pick up the EV 110 for their use. The input may be received from a user of the device.

In a contemplated embodiment, the data includes a desired drop-off location. In some implementations, the pick-up and drop-off location are not the same. A user may want to pick up an EV 110 from a first location, for instance, such as from a first EV lot at a first airport in a metropolitan area that the user flew into, and later drop off at a second location, such as a second EV lot at a second airport from which the user will fly out of.

The user device computer-readable code in various embodiments includes a vehicle-reserving application performing steps shown at the device 150. Or the user may access the vehicle-reserving application online via a browser from the user device 150.

The person indicating the pick-up and location is in some implementations not the person to drive or ride in the EV 110. The person can be, for instance, an assistant, parent, or supervisor of a person to drive the EV 110, or a driver to drive the person in the EV 110.

For embodiments in which the subject EVs 110 are part of a shared fleet, such as a fleet for delivering packages or driving passengers, the pick-up time and location, or at least the pick-up time, may be entered by a person other than the driver or a passenger of the EV 110. A scheduling or dispatch computer system may indicate the time at block 312, for instance, and also the location in some implementations.

In some embodiments, the user enters the location(s) first, and the vehicle-reserving application returns available time(s) from which the user can choose. In some embodiments, the user enters a desired time(s) first, and the vehicle-reserving application returns available location(s) from which the user can choose. Such feedback from the server 120 is indicated by reference numerals 3211 and 3212.

At block 322, the tangible processor of the remote system 120, executing computer-executable code thereof, receives the time and location data 313, 315, indicating the time and the location selected.

Further at block 322, the remote system 120 determines an estimated time of use, based on the indicated pick-up time and drop-off time.

The remote system 120 is also in various embodiments programmed to determine an estimated power usage, or estimated power consumption, for the EV use being arranged. The programming may consider any suitable factor(s).

The programming in various embodiments includes algorithms for calculating the power expected to be used based on the time use determined, and in some embodiments includes a function of adding a buffer, or safety factor.

The programming in various embodiments provides a function of calculating likely drive distances with respect to time. The distance expectation is determined in some embodiments based on one or more additional factors such as time of day, time of year, pickup location, drop off location, driver profile characteristics, environmental characteristics such as weather, or traffic, the like or other. Other example environmental characteristics include ambient temperature and wind speeds.

The required vehicle charge may be associated with at least a base or expected vehicle configuration, as power depletion of an EV battery may be affected by, for example, age or type of battery, or age or type of vehicle, or known vehicle efficiency. A first EV needing to be used for two hours, for instance, does not need to be charged as much as a second EV needing to be used in the same way for the same time period if the first vehicle is more efficient—e.g., has a higher miles/kWh economy rating. As another example, a newer or more modern battery and/or EV may be more efficient than a battery and/or EV that is older or has an older design, and the same can be considered in determining a charge level needed for the use. The required charge may be presented in various values corresponding to respective configurations—e.g., various levels corresponding to respective battery types, battery ages, vehicle efficiency, or combinations thereof.

As another example, the programming may consider planned vehicle load during the desired use in determining needed power level. The system may determine, such as by the user indicating, that the user plans to haul construction materials or two a small trailer, for instance. The added weight effects power/fuel economy, and the programming may consider the effect in estimating the needed power level for the planned EV use.

A user profile may indicate, for instance, that the particular user typically, when checking out an EV from this location, or more particularly, from this location on Friday's, drives from the lot directly to a grocery store, then to a nursing home (to visit her grandmother, for instance), and then returns directly to the lot two hours later.

Type of driving expected and pick-up and/or drop-off location data may be related or the same. The remote-system programming can accommodate, for instance, that a car being picked up in the country will likely be driven differently—e.g., more highway or longer roads without stops—than downtown driving—more stops, less distance, for instance.

In contemplated embodiments, the remote system 120 receives from the user device 150, and/or generates, data indicative of an intended use of the EV 110. The use data may also be used in determining an estimated power usage for the EV use being arranged. The driver may indicate via the user device 150 that they plan to drive the vehicle 45 miles, for example.

Or the user may indicate that they intend to drive from the airport lot to a particular hotel, to a certain restaurant, to a given stadium, and then back to the hotel before heading back to the airport, for instance, which can be translated to the expected distance to be driven.

In some implementations, the user provides an indication of the amount of time they intend to use the EV 110. While they may be checking out the vehicle for two days, for example, they may indicate that they only plan to drive for a few hours on the first day and only one hour on the second day.

Expected driving distance and/or time can also be determined based on context such as user itinerary, user driving history or pattern(s), other driver history or patterns, other big data factors, etc.

In any event, the remote system 120 can determine an estimated power usage based on time and/or distance data.

The remote-system programming in various embodiments causes the remote system 120 to determine the safety factor based on typical driver or driving characteristics. The characteristics may indicate, for instance, how (e.g., distance, time, locations) that a typical driver drives under some like circumstances—location, time of day, time of year, type of driver (e.g., age, profession, other demographic data), the like or other.

The programming may cause the remote system 120 to use typical-driver data indicating, for instance, that drivers under one or more similar circumstance factors (e.g., location or time of pickup) tend to drive an average of 40 minutes out of every hour that they have the vehicle checked out. Based on the typical-driver data, the remote system 120 may determine that vehicle must be charged to at least a power level allowing for driving at least 50 minutes for every hour that the vehicle is checked out. The determination may be disregarded or adjusted in some circumstances, such as a known user itinerary, traffic, weather, user historic driving data, the like, or other factors.

The remote-system programming may include a pre-set multiple, percentage, or similar factor, or be configured to cause the remote system 120 to determine such a factor. The factor may be, for instance, 0.2, such that a 10 mile safety factor would be added to a 50 mile estimated driving distance. The same may concept can be used to add a safety factor of time to a selected reservation duration.

Or a safety factor can be added directly to an estimated power level—e.g., adding need of 5% battery capacity. If a vehicle is at 50%, and the estimated need is 75%, for instance, the sum needed capacity would be 80%.

In some embodiments, data received from the user device 150 includes other user preferences or profile information, such as vehicle type, class, make, or model preference—e.g., mid-size, SUV, Chevy Volt, Chevy Spark, etc. Such preference information may be kept at a user profile, stored at the user device 150 or the remote system 120, such that the user does not need to input the preference each time they book a vehicle 110.

With continued reference to FIG. 3, at block 342, each, or at least a plurality, of the EVs 110 provides power-level data 343 to the smart-charging station 140. The function may be performed by tangible processors of the EVs 110 executing respective computer-executable code stored at a non-transitory computer-readable storage device thereof.

The power-level data 343 may be provided by the EVs 110 in response to a request 331 from the charging station 140. The power-level data 343 includes or is accompanied by an identifier, identifying the EV 110 from which the power-level data 343 is provided. Any suitable identifier may be used, such as a vehicle identification number (VIN), or other number or code representing the EV 110.

In some embodiments, power-level data 343 from each EV 110 includes or is accompanied by data indicating whether the EV 110 is being charged presently. In a contemplated embodiment, the power station 140 adds data to the power-level data, such as data indicating whether the EVs 110 are being charged presently.

The power-level data 343 is processed at the smart-charging station 140 and/or the remote system 120 in any suitable manner to accomplish the goals of the present technology.

At block 332, the power station 140 receives the power-level data 343 and passes it along to the remote system 120. Functions of the power station 140 and the remote system 120 are performed by respective tangible processors thereof, executing computer-executable code stored at non-transitory computer-readable storage devices thereof.

In a contemplated embodiment, the EVs 110 send the power-level data 343 directly to the remote system 120, without the power station 140 intermediating. The sending may be made by way of any suitable communication network 130.

The charging station 140 in various embodiments sends power-level data or a reformatted version thereof $333^2$ in response to a trigger, such as a request $333^1$ for the data 343 from the power station 140 or the remote system 120.

In contemplated embodiments, each EV 110 is programmed or instructed to provide its power-level data 343 at certain times, such as periodically (every 15 or 30 minutes, for instance).

At block 324, the remote system 120 receives the EV power-level data $333_2$. The remote system 120 at block 324 also receives estimated power level consumption data 323, determined at block 322 based on reservation data indicating, for instance pickup and drop off times.

Based on the power-level data $333_2$ and the estimated power consumption 323, the remote system 120 determines which EVs 110 are options for the desired EV use. The vehicle options include those at the subject pick-up location having a sufficient power level for the planned use.

In a contemplated embodiment, the remote system 120 has access to data identifying vehicles that will be at the subject lot at the pickup time, but are not there yet. The power-level data $333_2$ can indicate a discounted level of power for each such EV, accounting for power use expected between now and the time that the EV will be at the subject lot.

In various embodiments, the remote system 120 is configured to determine that an EV has a qualifying, sufficient power level if its power-level data $333^2$ indicates a power level that is at least equal to the estimated power consumption 323.

Further, in some implementations, the remote system 120 is configured to determine that an EV has a qualifying, sufficient power level if its power-level data $333^2$ indicates a power level that is at least equal to the estimated power consumption 323 and the safety-factor amount of power described above. In these implementations, the estimated power consumption and the safety factor amount can be referred to collectively as the estimated power consumption.

The remote system 120 may categorize the EVs 110 having sufficient power into a first group, such as a first listing of vehicle identifiers (VID1).

The remote system 120, in some embodiments, determines, based on the estimated power consumption data 323, that an EV 110 has a qualifying, adequate power level (though not presently sufficient) if the remote system 120 the EV 110 has a power level allowing it to be charged before the pickup time to the sufficient power level.

In various embodiments, in determining which vehicles have adequate power, the remote system 120 uses data indicative of a charging rate at smart-charging station, or the speed at which the station can charge, along with estimated power usage data 323 and the EV power-levels data $333^2$.

The remote system 120 may categorize the EVs 110 that do not have adequate power (not enough power to allow the EV to be charged sufficiently in time for the planned use) into a second group, such as a second listing of vehicle identifiers (VID2). And the system 120 may categorize the EVs 110 having adequate power, thought yet sufficient power, into a third group, such as a third listing of vehicle identifiers (VID3).

The remote system 120 may also at this stage 324 determine a first charging sequence (CS1), for charging the adequately charged EVs (VID3), or the smart-charging station 140 may perform the operation at 334.

For cases in which the remote system 120 determines the charging sequence (CS1), the remote system 120 sends the sequence (CS1) to the smart-charging station 140 for execution (communication not represented by arrow in FIG. 3).

A benefit of executing such a first charging sequence (CS1) is that any needed charging of EVs 110 that may satisfy the user vehicle need can be commenced or at least queued. EVs having sufficient power (VID1) already, or not enough to be charged in time (VID2), are either not included in the charging sequence (CS1) determined, or are listed and associated with an indication (e.g., a not-to-be-charged section of the sequence) that the EV does not need to be charged, or at least not in connection with this user request for vehicle.

With continued reference to FIG. 3, at block 324, the remote system 120 sends, to the user device 150, qualifying-EV data 325 indicating at least the first group of EVs (VID1) regarding the subject pickup location. In some embodiments, the qualifying-EV data 325 also indicates the third group of EVs (VID3).

At block 316, the user device 150 receives the qualifying-EV data 325 and presents the EV options (VID1; or VID1 and VID3) to the user, such as via a tangible screen of the user device.

The user device 150 also receives selection of one of the EV options from the user at block 316, by way of a user-device interface such as a touch-sensitive screen, keyboard, or microphone of the user device.

The user device 150 communicates EV-selection data 317 to the remote system 120.

At block 326, the remote system 120 communicates the EV selection data, in the same format 317 or reformatted 327, to the smart-charging station 140.

The smart-charging station 140 at block 334 either updates the first charging sequence (CS1) as needed, or implements a new charging sequence, to accommodate the EV selection data 317, 327, yielding a second charging sequence (CS2).

Or the smart-charging station 140 at block 334 determines that no change to the charging sequence, or no new charging sequence, is needed.

For implementing the applicable charging sequence, as described above regarding the smart-charging station 140, and U.S. Published Patent Application No. 2014-0354229, the station in various embodiments includes a charging controller 142, a charging base 144, which can include a charging robot, movable in various embodiments along a charge-station track 146, and a charging connector 148, including an end effector, or port, for connecting to the vehicles 110.

The smart-charging station 140 implements the applicable charging sequence—e.g., CS2—with respect to EVs 110 at the lot. The selected EV 110 is either already charged sufficiently, or charged 334, 344 in accordance with the applicable sequence by an amount and in time needed for the use planned by the user of the user device 150.

As an example implementation of the charging sequence, assume that the selected EV 110 is EV4 out of 7 EVs (EV1-EV7), that EV2 is scheduled for pick up in two hours, that EV4 is scheduled to be picked up in five hours, that EV 7 is scheduled to be picked up the next morning, and that each of these EVs require some charging. The other EVs—EVs 1, 3, 5, and 6—are either sufficiently charged, not being considered for pickup, or not scheduled for pickup. The charging sequence could call for charging EV2, first, then for EV4, second, and then EV7.

In some cases, the charging station 140 is configured to determine that it is beneficial to charge a second vehicle before a first vehicle, even though the first vehicle is scheduled to be picked up first. This may be because, the first vehicle requires only a slight charging, and the programming determines that it is better to schedule the latter, larger, charging, later, such as when power rates are lower, or to have the second vehicle charged its needed power levels sooner, or have more vehicles at the lot charged to the respective needed power levels sooner.

The charging-station logic and/or the charging sequence determined may be configured so that one or more efficiencies, such as power savings, cost savings, and savings in charging-machinery use, are accomplished in implementing the charging sequence.

The charging station 140 may be programmed, in some embodiments, such that EVs that are sufficiently charged, or not scheduled be picked up—e.g., EVs 1, 3, 5, and 6 in the example—those EVs are not charged in the present sequence. By not charging vehicles that are not scheduled for near-term use, power is saved.

As another example, assume a selected EV is charged to 25% power, and that a user would like to use the EV for a time requiring only 10% of the power—e.g., to run a few errands. The vehicle thus does not need to be charged for the use. Power is thus saved by not charging the vehicle beyond what is needed. The vehicle will eventually need to be charged, but that may be done when the vehicle is returned, or at another lot, and possibly at a time when the charger is not needed to charge other vehicles and/or when power rates are lower.

If the charging station 140 is configured to charge more than one vehicle at a time, the applicable charging sequence and station logic may determine which vehicles to charge simultaneously, or at times still one at a time.

The sequence is in various embodiments configured to charge only EVs 110 as needed. For instance, if an EV is initially at 30% charge, an expected next use, later in the day, requires only 45% charge (e.g., 40% charge expected maximum use plus a 5% safety factor), then the EV need only be charged to 45%, and not beyond. This allows the charger to be used sooner for charging other vehicles, and saves power and charging-station machinery use (wear and tear) by not overcharging at the time.

As referenced, the charging station logic and/or the charging sequence determined, in various embodiments, also considers savings opportunities, such as ways to save power, money, and/or machine use relating to charging EVs 110. The charging station may, as able, schedule a charging for a time when cost of power is low, such as 2 a.m. to 5 a.m., for instance.

In these and other ways, benefits of the present technology include minimizing or at least lowering charging cycle times, and time to charge each EV in many cases, and charging-machinery wear and tear.

Also in these ways, benefits of the present technology include minimizing or at least lowering requirement or load on the power source, such as the electric grid, for charging vehicles and also possibly for powering charging-related machinery. The charging station thus has a smaller power footprint, and saves cost and time, and charging-station machinery use (wear and tear), relating to charging vehicles at the lot, as compared to any conventional charging apparatus.

As also referenced, while select examples of the present technology relate to EVs, generally, including EREVs, the technology can be used with hybrid electric vehicles (HEVs). In contemplated embodiments, the technology is used with vehicles that are not EVs, such as fully gasoline-fueled vehicles, instead of EVs or along with EVs in the same lot. Electrical charging components can be supplemented with appropriate fueling components. For lots having HEVs, applicable charging and/or fueling components, for charging and/or fueling the HEVs are used.

Electric and/or other fuel chargers and/or pumps at the station 140, which may be automated, such as by being controlled by the mentioned controller and robot or other suitable arrangement.

For embodiments in which an EV 110 to be checked out by a user uses another power source, such as gasoline, along with (hybrid vehicles) or instead of electric power, processing analogous to the charging operations described above are used. The station 140 could prepare, for instance, a charging-and-fueling sequence for lots including HEVs and/or non-electric vehicles, based on the respective fuel/charging levels and the estimated power (electric or fuel) level consumption data 323.

The process can end or any one or more operations of the process can be performed again.

V. Alternative Smart-Charging Arrangement and Method—FIGS. 4-5

Figure 4:
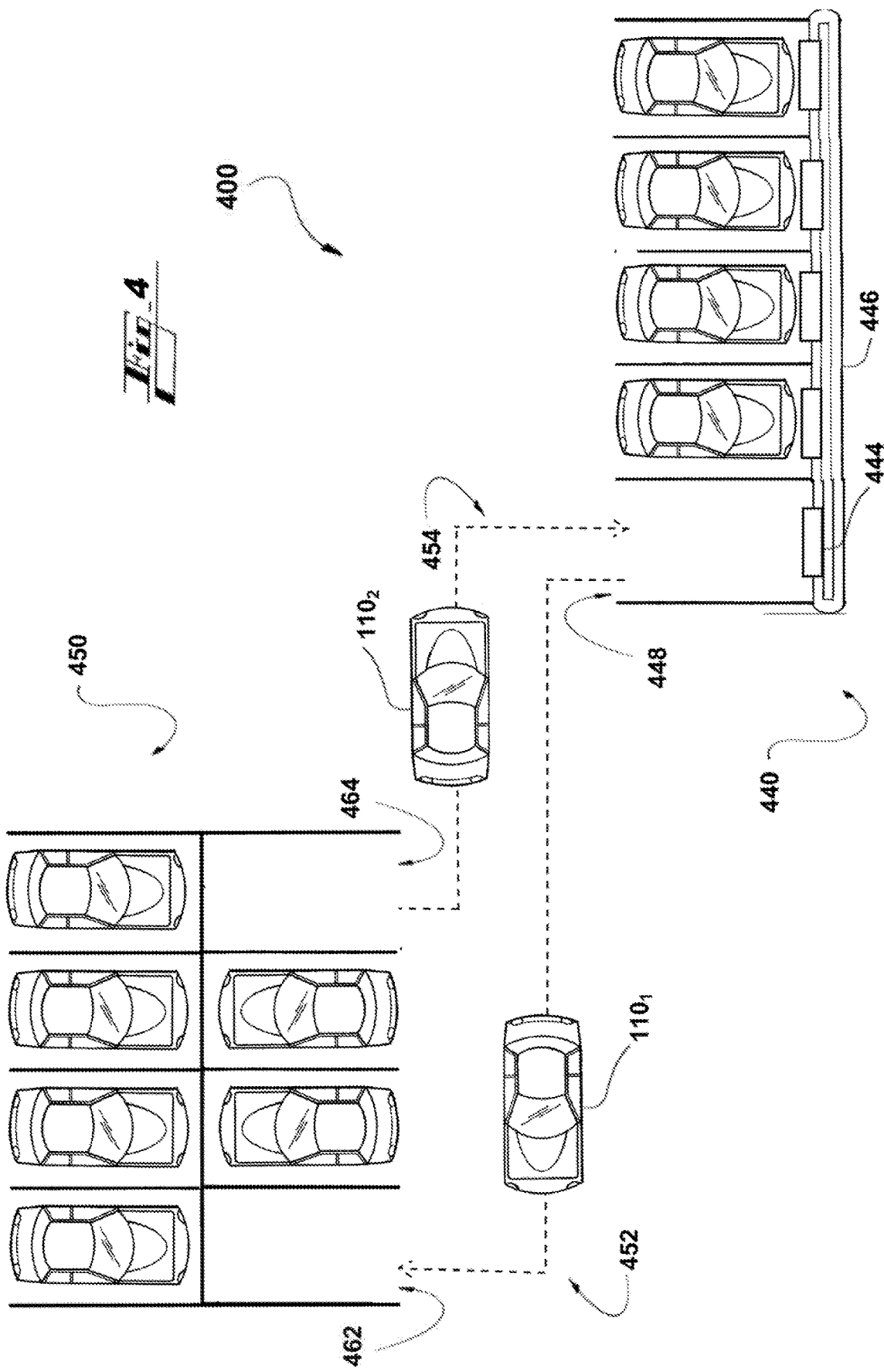
FIG. 4 illustrates schematically an arrangement for smart-charging shared electric vehicles while utilizing autonomous driving functions.

FIG. 4 shows a charging arrangement 400 for smart-charging shared electric vehicles 110, including a charging station 440 and a waiting area 450. The charging station 440 is configured to charge one or more electric vehicles. The waiting area 450 is configured to store one or more electric vehicles before and/or after charging is completed at the charging station 440.

The charging station 440, similar to charging station 140 described in association with FIG. 1 may include a charging base 444 and a charge-station track 446.

In some embodiments, the charging base 444 is responsible for charging the vehicle 110 and a charging connector is not required. Utilizing the charging base 444 without a connector allows autonomous and semi-autonomous vehicle functions to move and position a vehicle for charging at the charging station 440 with little to no involvement by the driver.

In some embodiments, the charging base 444 is positioned on the ground and configured to allow for the vehicle to be positioned on top of or in contact with the charging base. For example, the charging base 444 may allow for wireless charging (e.g., inductive charging), where electricity is transferred through an air gap from one electrically-conductive device (e.g., magnetic coil) located at or in the charging base 444 to a second electrically-conductive device (e.g., magnetic coil) located at the vehicle. In some embodiments, the vehicle may be retrofitted with to allow for wireless charging (e.g., aftermarket wireless adaptor).

In some embodiments, the charging station 440 and charging base 444 can be a 1-to-1 ratio, as illustrated in FIG. 4. In other embodiments, the charging base 444, has a 1-to-N ratio where one charging base supplies charge to each space within the charging station (e.g., as illustrated in FIG. 1). In some embodiments the charging base 444 is controlled by a charging controller (not shown) and can to move along the track 446. The charging controller comprises, for instance, computer-executable code stored at a controller storage device that, when executed by a processing unit of the charging controller, controls at least position of the charging base 444 on the track 446.

For embodiments in which the charging base 444 includes robotics, or automated components or machinery, the charging controller comprises computer-executable code that, when executed by a processing unit of the charging controller, controls the charging base 444 accordingly. The charging controller thus in various embodiments controls positioning of the charging base 444 along the track 446 to a selected electric vehicle 110.

Similar to the charge-station track 146 described in association with FIG. 1, the charge-station track 446 can come in any of a variety of arrangements, such as a ground or vehicle-level track, and an overhead or high-level track.

As an illustrative example, FIG. 4 shows an available parking space 448 within the charging station 440. Once the charging for a first vehicle 1101 has completed, the vehicle 110₁ moves (e.g., autonomous or semi-autonomous driving functions) along a first path 452 to a first parking space 462 in the waiting area 450. A vehicle 110₂ is selected for charging and moves (e.g., autonomous or semi-autonomous driving functions) from a second space 464 in the waiting area 450 along a second path 454 to the available charging parking space 448 in the charging station 440. Further details concerning the process associated with selecting a vehicle from the waiting area 450 for charging is described in association with FIG. 5.

FIG. 5 is flow chart illustrating an example autonomous charging process 500 of an electric vehicle using the charging arrangement of FIG. 4.

It should be understood that steps, operations, or functions of the processes are not necessarily presented in any particular order and that performance of some or all the operations in an alternative order is possible and is contemplated. The processes can also be combined or overlap, such as one or more operations of one of the processes being performed in the other process.

The operations have been presented in the demonstrated order for ease of description and illustration. Operations can be added, omitted and/or performed simultaneously without departing from the scope of the appended claims. It should also be understood that the illustrated processes can be ended at any time.

In various embodiments, some or all operations of the processes and/or substantially equivalent operations are performed by one or more computer processors, such as the processor of the corresponding apparatus (e.g., a hardware-based processing unit regarding operations of the charging controller of the charging station) executing computer-executable instructions, which may be arranged in modules as described and stored on a non-transitory computer-readable storage device of the corresponding apparatus (e.g., a data storage device regarding the operations of the charging controller of the charging station).

The process 500 begins at 501 and proceeds to decision diamond 505, where the process 500 determines if a parking space is available at the charging station 440 (e.g., available parking space 448).

If no parking space is available at the charging station 440 (e.g., path 510), the process moves to block 520 where the uncharged vehicle is parked in an available parking space at the waiting area 450. In some embodiments, the vehicle 110 is parked utilizing autonomous or semi-autonomous features of the vehicle 110 to position the vehicle 110 in an empty parking space at the waiting area 450.

When a parking space becomes available the vehicle 110 parked at the waiting area 450 is moved. The process moves along path 525 to decision diamond 505.

If a parking space is available at the charging station 440 (e.g., path 515), the process moves to block 530 where the controller selects a vehicle from the waiting area 450 to be charged. Specifically, when a parking space is available, the charging station 440 (e.g., using a controller) will communicate a "drive in" signal to the vehicle 110 (e.g., V2X communication).

In some embodiments, the process selects the vehicle to be charged next vehicle to be charged is selected based on a "first come, first serve" sequence algorithm executed by the controller. In some embodiments, the vehicle is provided with a time stamp (e.g., V2X in communication with the charging arrangement 400) to denote the time at which the vehicle arrives at the charging arrangement 400 and proceeds to the waiting area 450 to await charging. For example, a first vehicle that arrives to be charged at the charging arrangement 400 is given a first time stamp. Where no space is available at the charging station 440, the first vehicle proceeds to the waiting area 450. A second vehicle that arrives to be charged at the charging arrangement 400 after the first vehicle is given a second time stamp subsequent to the first time stamp. When an available parking space 448 becomes available at the charging station 440, the first vehicle is chosen for charging under the "first come, first serve" sequence based on the first time stamp.

In some embodiments, the process selects the vehicle to be charged next vehicle to be charged is selected based on a predetermined charging sequence algorithm (e.g., as described in association with FIG. 3). In some embodiments, the predetermined charging sequence algorithm correspond as shown to algorithms and operations of the user device 150, the remote system 120, the smart-charging station 440, and the electric vehicle (EV) 110. Operations such as the pickup time, drop off time, current battery power level, required battery power level, estimated battery power consumption, etc. For example, a first vehicle that arrives to be charged at the charging arrangement 400 prior to a second vehicle. However, if the second vehicle has operations that may move up a priority number in the sequence, it is charged prior to the first vehicle. For example, if the second vehicle pickup time is sooner than the pickup time of the first vehicle, the second vehicle will be selected for charging prior to the first vehicle. As another example, if the second vehicle requires power level that would take a greater amount of charging time than the first vehicle, the second vehicle will be selected for charging prior to the first vehicle. One of skill in the art would appreciate that multiple factors can be used to determine a charging priority vehicles in the waiting area 450.

Once the vehicle to be charged has been selected, the process moves to block 540 where the uncharged vehicle 110 is moved to the available parking space 448 in at the charging station 440. In some embodiments, the vehicle 110 is parked in the available parking space 448 utilizing autonomous or semi-autonomous features of the vehicle 110 to position the vehicle 110 in the available parking space 448.

At block 550, the vehicle is charged according to specifications of the vehicle (e.g., as communicated by the V2X). For example, a vehicle may be charged for a predetermined amount of time or until the vehicle reaches predetermined power level.

At decision diamond 560, the process determines if charging for the vehicle is complete. Specifically, the process determines if the specifications of the vehicle (e.g., as communicated by the V2X) have been met. If charging is not complete (e.g., predetermined amount of time has not passed or the required battery power level is not reached) (e.g., path 555), the process continues charging at block 560.

In some embodiments, charging is determined to be complete when the vehicle recharges completely (i.e., 100% of battery capacity). In other embodiments, charging is determined to be completed when the vehicle reaches a charge predetermined by the owner. For example, the owner specifies that the vehicle should be charged to 50% of the vehicle capacity. An owner may specific that the vehicle be charged to a specific capacities in situations where the owner would like to conserve resources (e.g., reduce energy consumption) or the owner is limited in time (e.g., owner expects to need the vehicle a short time after arrival). In yet other embodiments, charging is determined to be complete when the vehicle reaches a charge predetermined by another source, the predetermined charging sequence algorithm described in association with FIG. 3. For example, the controller determines the vehicle is charged complete when it has reached a 75% of the vehicle capacity. As discussed above, the amount of charging required for a vehicle include factors that estimate anticipated power usage of the vehicle such as the time use determined, drive distance, time of day, time of year, location of pickup, location of drop off, driver profile characteristics, environmental characteristics (e.g., temperature, wind speed, altitude) such as weather, or traffic, the like or other.

If charging is complete (e.g., predetermined amount of time has passed or the required battery power level has been reached) (e.g., path 567), the process moves to block 570 where the charged vehicle 110 moves from the parking space. Specifically, when charging is completed, the charging station 440 (e.g., using a controller) will send a "drive out" signal to the vehicle 110 (e.g., V2X communication).

In some embodiments, at block 580, the charged vehicle moves to the designated waiting area 450 until the driver is ready to retrieve the vehicle. In some embodiments, the vehicle 110 is moved utilizing autonomous or semi-autonomous features of the vehicle 110 to position the vehicle 110 in an empty parking space at the waiting area 450.

The process may end at 590 or repeat at 501 or other subsequent operation.

VI. Select Advantages

Many of the benefits and advantages of the present technology are described above. The present section restates some of those and references some others. The benefits described are not exhaustive of the benefits of the present technology.

Managing vehicle reservations and charging in the ways provided herein has various benefits. One benefit is conservation of power, in using less source energy, to charge vehicles and/or power charging-related machinery, in temporary-use vehicle lots. Example temporary uses including renting, borrowing, sharing, uses by which the user does not own, or at least does not fully own the vehicle.

In addition to saving cost, using less energy can benefit the environment, such as by decreasing a load on the power grid or source, and so a carbon footprint, or other ecological measure, for vehicle charging lots.

The technology can also limit use of charging-station machinery, and so wear and tear, relating to charging vehicles.

The automated features described, such as the automated charging controls and machinery, save personnel time and energy by implementing charging schedules automatically.

VI. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Directional references are provided herein mostly for ease of description and for simplified description of the example drawings, and the systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface may be referenced, for example, the referenced surface can, but need not be, vertically upward, or atop, in a design, manufacturing, or operating reference frame. The surface can in various embodiments be aside or below other components of the system instead, for instance.

Any component described or shown in the figures as a single item can be replaced by multiple such items configured to perform the functions of the single item described. Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed is:

1. A system, for use in connection with custom powering of a vehicle, comprising:
    a charging station track;
    at least one charging base positioned at or along the charging station track at an available parking position along the charging station track; and
    a controller comprising:
        a processing hardware unit; and
        a non-transitory storage device comprising computer-executable code that, when executed by the processing hardware unit, causes the processing hardware unit to perform operations comprising:
            receiving, from the vehicle, a power level indicating a current power level of the vehicle and a time stamp indicating an arrival time of the vehicle to a location proximate to the charging station track;

sending, to the vehicle, a first signal causing the vehicle to autonomously move from a designated waiting area to the available position along the charging station track, wherein the designated waiting area comprises one or more parking spaces for storage of one or more vehicles, and wherein the vehicle is autonomously moved from the designated waiting area to the available parking position using autonomous driving functions of the vehicle that are carried out in response to receiving the first signal at the vehicle;

charging, using the charging base, the vehicle to a predetermined power level; and sending, to the vehicle, a second signal causing the vehicle to autonomously move out of the available position at the charging station, wherein the second signal causes the vehicle to autonomously move to an available parking space of the designated waiting area using autonomous driving functions of the vehicle so that the vehicle is stored at the designated waiting area until picked up by a user.

2. The system of claim 1, further comprising a charging base positioned at or along the charging station track at each parking position of a plurality of parking positions along the charging station track.

3. The system of claim 1, wherein the vehicle is one of a plurality of vehicles and the first signal is sent to the vehicle based on the time stamp of the vehicle preceding time stamps of other vehicles of the plurality of vehicles.

4. The system of claim 1, wherein the vehicle is one of a plurality of vehicles and the first signal is sent to the vehicle based on the current power level of the vehicle being lower than current power levels of other vehicles of the plurality of vehicles.

5. The system of claim 1, wherein the second signal is sent to the vehicle when the vehicle reaches a maximum charge.

6. The system of claim 1, wherein the receiving operation further comprises receiving, from a user, a desired pick up time and the desired pick up time determines when the first signal is sent to the vehicle.

7. The system of claim 1, wherein the predetermined power level is based one or more factors selected from a group consisting of:
   a desired pick up time;
   an amount of power needed for the vehicle to reach a subsequent destination;
   an environmental characteristic in an area corresponding to the desired use;
   a traffic condition in the area corresponding to the desired use;
   a road condition in the area corresponding to the desired use; and
   an expected type of driving for the desired use.

8. A method, for use in connection with custom powering a vehicle, comprising:
   receiving, by a controller comprising a processing hardware unit and a non-transitory storage device, a power level indicating a current power level of the vehicle and a time stamp indicating an arrival time of the vehicle to a designated waiting area proximate to a charging station track, wherein the designated waiting area comprises one or more parking spaces for storage of one or more vehicles;
   receiving, by the controller from a user, a desired pick up time;
   sending, by the controller, a first signal to the vehicle causing the vehicle to autonomously move from the designated waiting area to an available parking position along the charging station track, wherein the desired pick up time is used to determine when the first signal is sent to the vehicle, and wherein the vehicle is autonomously moved from the designated waiting area to the available parking position using autonomous driving functions of the vehicle that are carried out in response to receiving the first signal at the vehicle;
   charging, using a charging base positioned along the charging track at or near the available parking position, the vehicle to a predetermined power level; and
   sending, to the vehicle, a second signal causing the vehicle to autonomously move out of the available position at the charging station, wherein the second signal causes the vehicle to autonomously move to an available parking space of the designated waiting area so that the vehicle is stored at the designated waiting area until the desired pick up time.

9. The method of claim 8, wherein the vehicle is one of a plurality of vehicles and the first signal is sent to the vehicle based on the time stamp of the vehicle preceding time stamps of other vehicles of the plurality of vehicles.

10. The method of claim 8, wherein the vehicle is one of a plurality of vehicles and the first signal is sent to the vehicle based on the current power level of the vehicle being lower than current power levels of other vehicles of the plurality of vehicles.

11. The method of claim 8, wherein the second signal is sent to the vehicle when the vehicle reaches a maximum charge.

12. The method of claim 8, wherein the predetermined power level is based one or more factors selected from a group consisting of:
   a desired pick up time;
   an amount of power needed for the vehicle to reach a subsequent destination;
   an environmental characteristic in an area corresponding to the desired use;
   a traffic condition in the area corresponding to the desired use;
   a road condition in the area corresponding to the desired use; and
   an expected type of driving for the desired use.

13. A system, for use in connection with custom powering of vehicles, comprising:
   a charging station track;
   at least one charging base positioned along the charging station track and that is moveable between a plurality of parking positions along the charging station track; and
   a controller comprising:
     a processing hardware unit; and
     a non-transitory storage device comprising computer-executable code that, when executed by the processing hardware unit, causes the processing hardware unit to perform operations comprising:
       receiving, from each of a plurality of vehicles, a power level indicating a current power level of each vehicle and a time stamp indicating an arrival time of each vehicle to a location proximate to the charging station track;
       selecting a designated vehicle within the plurality of vehicles for charging;
       sending, to the designated vehicle, a first signal causing the designated vehicle to autonomously move from a designated waiting area to an available position along the charging station track, wherein the designated waiting area comprises one or more parking spaces for storage of one or more vehicles, and wherein the designated vehicle is autonomously moved from the designated waiting area to the available parking position using autonomous driving functions of the designated vehicle that are carried out in response to receiving the first signal at the designated vehicle;

moving the charging base along the charging station track so that the charging base is positioned to charge the designated vehicle when the designated vehicle is located within the available position;

causing the charging base to charge the designated vehicle to a predetermined custom power level; and sending a second signal causing the designated vehicle to autonomously move out of the position at the charging station, wherein the second signal causes the designated vehicle to autonomously move to an available parking space of the designated waiting area so that the designated vehicle is stored at the designated waiting area until picked up by a user.

14. The system of claim 13, the operations further comprising selecting a subsequent designated vehicle within the plurality of vehicles for charging.

15. The system of claim 13, wherein the first signal is sent to the designated vehicle based on the time stamp of the designated vehicle preceding time stamps of other vehicles of the plurality of vehicles or the current power level of the vehicle being lower than current power levels of other vehicles of the plurality of vehicles.

16. The system of claim 13, wherein the second signal is sent to the designated vehicle when the vehicle reaches a maximum charge.

17. The system of claim 13, wherein the predetermined power level is based one or more factors selected from a group consisting of:
  a desired pick up time;
  an amount of power needed for the designated vehicle to reach a subsequent destination;
  an environmental characteristic in an area corresponding to the desired use;
  a traffic condition in the area corresponding to the desired use;
  a road condition in the area corresponding to the desired use; and
  an expected type of driving for the desired use.

* * * * *